(12) United States Patent
Wang et al.

(10) Patent No.: US 8,318,076 B2
(45) Date of Patent: Nov. 27, 2012

(54) SELECTIVE DEPOSITION MODELING METHODS FOR IMPROVED SUPPORT-OBJECT INTERFACE

(75) Inventors: Hongqing Vincent Wang, Fort Mill, SC (US); Pavan Kumar, Rock Hill, SC (US); John Stockwell, Sylmar, CA (US); Khalil Moussa, Charlotte, NC (US); Rajeev Kulkami, Charlotte, NC (US)

(73) Assignee: 3D Systems, Inc., Rock Hill, SC (US)

( * ) Notice: Subject to any disclaimer, the term of this patent is extended or adjusted under 35 U.S.C. 154(b) by 194 days.

(21) Appl. No.: 12/815,890

(22) Filed: Jun. 15, 2010

(65) Prior Publication Data

US 2011/0304074 A1  Dec. 15, 2011

(51) Int. Cl.
*B29C 35/04* (2006.01)
(52) U.S. Cl. .......................... 264/401; 264/405; 264/497
(58) Field of Classification Search .................. 264/401, 264/405, 497
See application file for complete search history.

(56) References Cited

U.S. PATENT DOCUMENTS

| | | | |
|---|---|---|---|
| 4,999,143 A * | 3/1991 | Hull et al. | ..... 264/401 |
| 5,121,329 A | 6/1992 | Crump | |
| 5,260,009 A | 11/1993 | Penn | |
| 5,501,824 A | 3/1996 | Almquist et al. | |
| 5,594,652 A | 1/1997 | Penn et al. | |
| 5,695,707 A | 12/1997 | Almquist et al. | |
| 5,855,836 A | 1/1999 | Leyden et al. | |
| 6,133,355 A | 10/2000 | Leyden et al. | |
| 6,162,378 A | 12/2000 | Bedal et al. | |
| 6,169,605 B1 | 1/2001 | Penn et al. | |
| 6,175,422 B1 * | 1/2001 | Penn et al. | ..... 358/1.1 |
| 6,193,923 B1 | 2/2001 | Leyden et al. | |
| 6,270,335 B2 | 8/2001 | Leyden et al. | |
| 6,841,589 B2 | 1/2005 | Schmidt et al. | |
| 7,176,253 B2 | 2/2007 | Xu et al. | |
| 7,364,686 B2 | 4/2008 | Kritchman et al. | |
| 7,378,460 B2 | 5/2008 | Schmidt et al. | |
| 7,399,796 B2 | 7/2008 | Xu et al. | |
| 2007/0229497 A1 | 10/2007 | Zinniel et al. | |
| 2009/0072447 A1 * | 3/2009 | Hull et al. | ..... 264/401 |

* cited by examiner

*Primary Examiner* — Galen Hauth
(74) *Attorney, Agent, or Firm* — Keith Roberson

(57) ABSTRACT

There are provided method and apparatus for the forming of three-dimensional objects in a layered fashion, wherein improvements are made to the support structure to improve the quality of the resulting three-dimensional objects. The support structure may include encapsulation along the interface boundary of the support-object interface to prevent or reduce the likelihood of separation of the build material, that forms the three-dimensional object, from the support material, that forms the support structure, or vice versa. The support structure may also or alternatively include both a porous support structure and a solid support structure to prevent or reduce the likelihood of separation of the support structure from the build platform and to improve the quality of the down-facing surfaces of the three-dimensional object. Methods are also provided for selectively depositing the support material and build material and for encapsulating the interface boundary with support material.

12 Claims, 8 Drawing Sheets

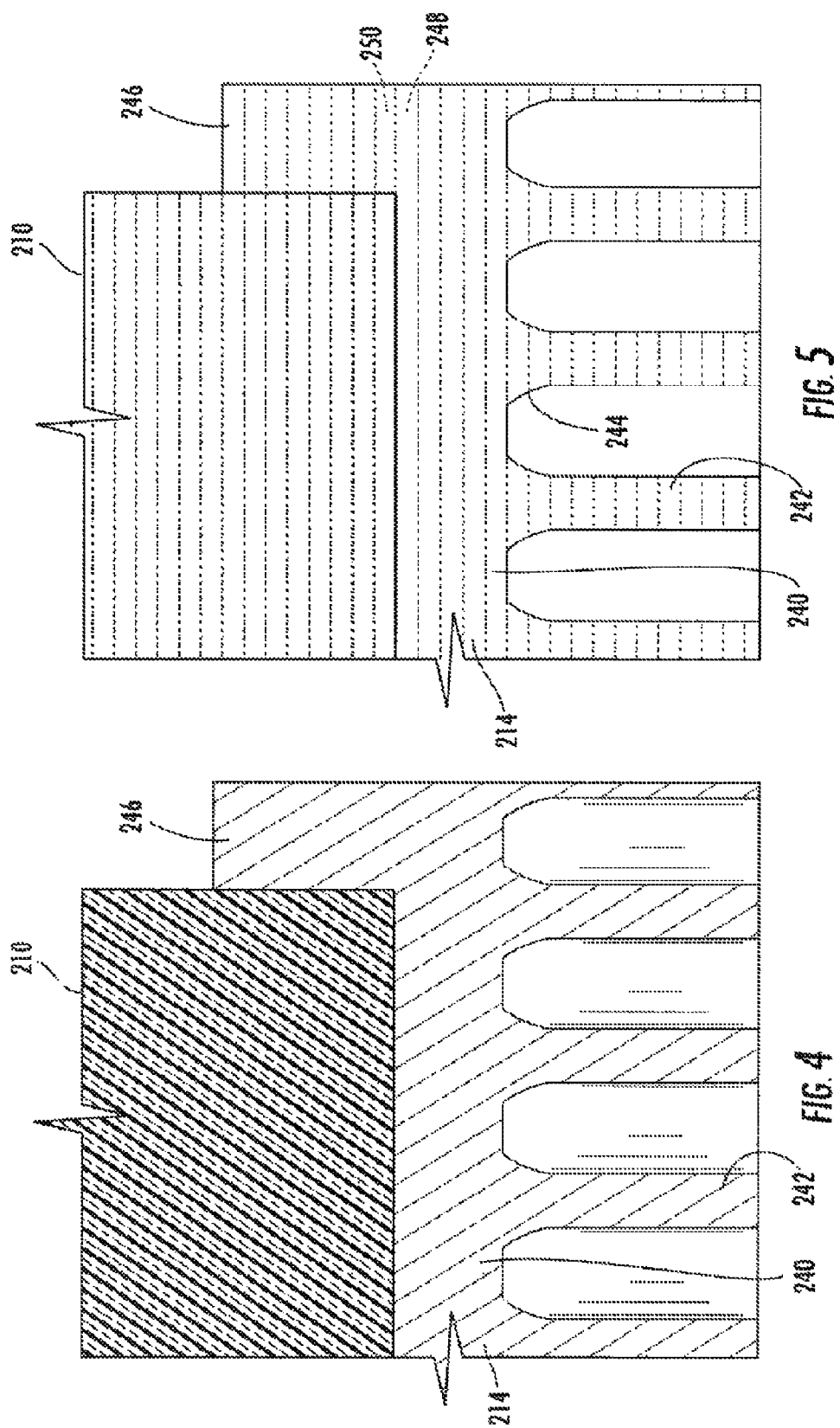

SELECTIVE DEPOSITION MODELING METHODS FOR IMPROVED SUPPORT-OBJECT INTERFACE

FIELD OF THE INVENTION

The present invention is related to selective deposition modeling of three dimensional objects, and more particularly, to methods for improved support-object interface and improved object surface features.

BACKGROUND OF THE INVENTION

Selective deposition modeling is one form of solid freeform fabrication, also known as additive manufacturing, for forming three-dimensional objects from computer aided design (CAD) data or other data defining the object to be made. Selective deposition modeling, sometimes referred to as 3D printing, is generally described in prior art patents, that include, but are not limited to, U.S. Pat. Nos. 4,999,143; 5,501,824; 5,695,707; 6,133,355; 6,162,378; 6,193,923; and 6,270,335 that are assigned to the assignee of the present application and the disclosures of which are incorporated by reference herein in their entirety.

Selective deposition modeling often includes the depositing of a build material to form the object and a support material that supports the build material during the forming of the object. The support material is typically removed after the object has been formed. Because the support material and build material may have different chemical and/or mechanical properties, selective deposition modeling with both materials can lead to undesirable effects, such as undesired surface features on the object being formed or undesired separation of one material from an adjoining surface of a different material that may result in inaccuracies in the final object.

Some prior art solutions to problems created by the use of support material and build material include providing a third material, such as an interface material. One example of a prior art solution that includes a distinct interface material is provided by U.S. Pat. No. 7,364,686, the disclosure of which is incorporated by reference herein in its entirety. However, providing a third material adds complexity and cost to the selective deposition modeling device and processes.

Therefore it is desirable to provide methods and apparatus for forming three-dimensional objects that include minimal or no undesirable surface features resulting from the interfaces created between the build material and/or the support material with one another and/or with other surfaces or materials.

BRIEF SUMMARY OF THE INVENTION

The various embodiments of the present invention provide methods and apparatus for improving the surface quality of the final three-dimensional object by improving the shape and/or design of the support structure created with the support material. For example, the support structure of certain embodiments of the present invention encapsulate an interface boundary defined along the perimeter of a support-object interface. The support-object interface is the area of contact, in the direction of the z-axis, between the build material and the support material. By encapsulating the interface boundary, these embodiments of the present invention minimize or eliminate the likelihood that the support material and the build material would undesirably separate from one another, which can lead to undesirable surface features on the final object. For example, the encapsulation in some embodiments provides a vacuum around the interface boundary, thus making it much more difficult for the support material and the build material to separate from one another. In another example, the encapsulation in other embodiments mechanically provides structural support to prevent or minimize undesirable separation of the support material and build material. In yet another example, the encapsulation of still further embodiments provides a combination of a partial vacuum and partial structural support that also prevents or minimizes undesirable separation of the support material and build material.

Additional embodiments of the present invention improve the down-facing surfaces of the object by improving the support-object interface. Some prior art techniques for preventing or minimizing undesirable separation of the support material and build material include providing a porous support structure of support material upon which the first layer (along the z-axis) of build material is deposited. This prior art technique provides additional surface area of contact between the support material and build material because a certain amount of build material can creep into some openings of the porous support structure such that the support-object interface is not just defined along a plane in the x-y axes but also defined by protruding (generally along the z-axis) amounts of build material into the openings of the support structure. One disadvantage of this approach is the resulting surface quality of the down-facing surface of the resulting three-dimensional object that must be post-processed to remove the tiny protrusions of build material. Such post-processing may include manually or automatically sanding the down-facing surfaces and/or exposing the down-facing surface to a solvent that removes a certain amount of build material. However, these and other post-processing steps add time and expense to the overall process for forming three-dimensional objects and they impose additional variables that can result in alternative undesirable surface features, such as by the use of too much sanding or too much solvent at some or all of the down-facing surfaces of the three-dimensional object. Some embodiments of the present invention overcome these problems by providing a solid support structure that defines a substantially smooth up-facing surface of the support structure so that the first layer of build material that is deposited on the solid support structure (the build material that results in the down-facing surface of the three-dimensional object) is substantially smooth. By providing a substantially smooth down-facing surface of the build material, the embodiments of the present invention eliminate or reduce the amount of post-processing required to improve the surface features of the three-dimensional object.

Certain embodiments of the present invention that selectively deposit the build material onto a solid support structure provide the solid support structure on a porous support structure. Providing a solid support structure directly on the platform of the selective deposition modeling apparatus can often lead to undesirable separation of the support structure from the platform during cooling of the support material comprising the support structure. The build process can be slowed down to reduce the likelihood of the support structure separating from the platform; however, such increases in build time directly reduce the productivity of the selective deposition modeling apparatus thus resulting in additional costs, including lost opportunity costs, to the operator of the apparatus. The undesirable separation of the support structure from the platform can lead to distortion of the support material and/or build material above the distortion thus creating undesirable features on the three-dimensional object. Certain embodiments of the present invention overcome this problem by first providing a porous support structure on the platform and then providing a solid support structure on the porous support structure. Still further embodiments of the present invention provide a transition support structure that transitions from the porous support structure to the solid support structure to provide adequate structural strength to the transition from porous to solid.

Still further embodiments of the present invention combine certain aspects of the embodiments described above and/or add additional or alternative aspects to the embodiments described above. Therefore, the various embodiments of the present invention provide improved control over the surface quality of the final three-dimensional object being formed by minimizing the likelihood of, or eliminating altogether, any undesirable separation of the support material and build material from one another or from other surfaces, such as the build platform.

BRIEF DESCRIPTION OF THE SEVERAL VIEWS OF THE DRAWINGS

Figure 1:
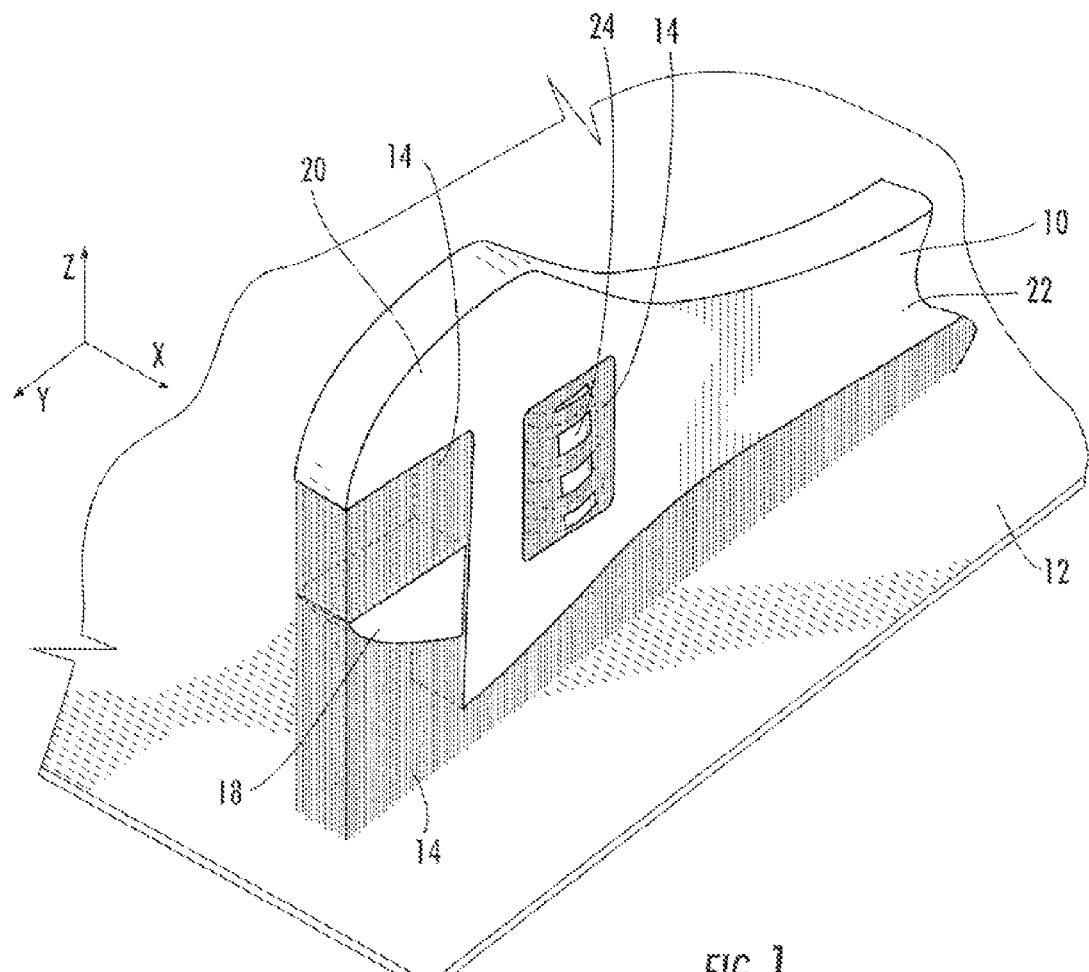
Figure 2:
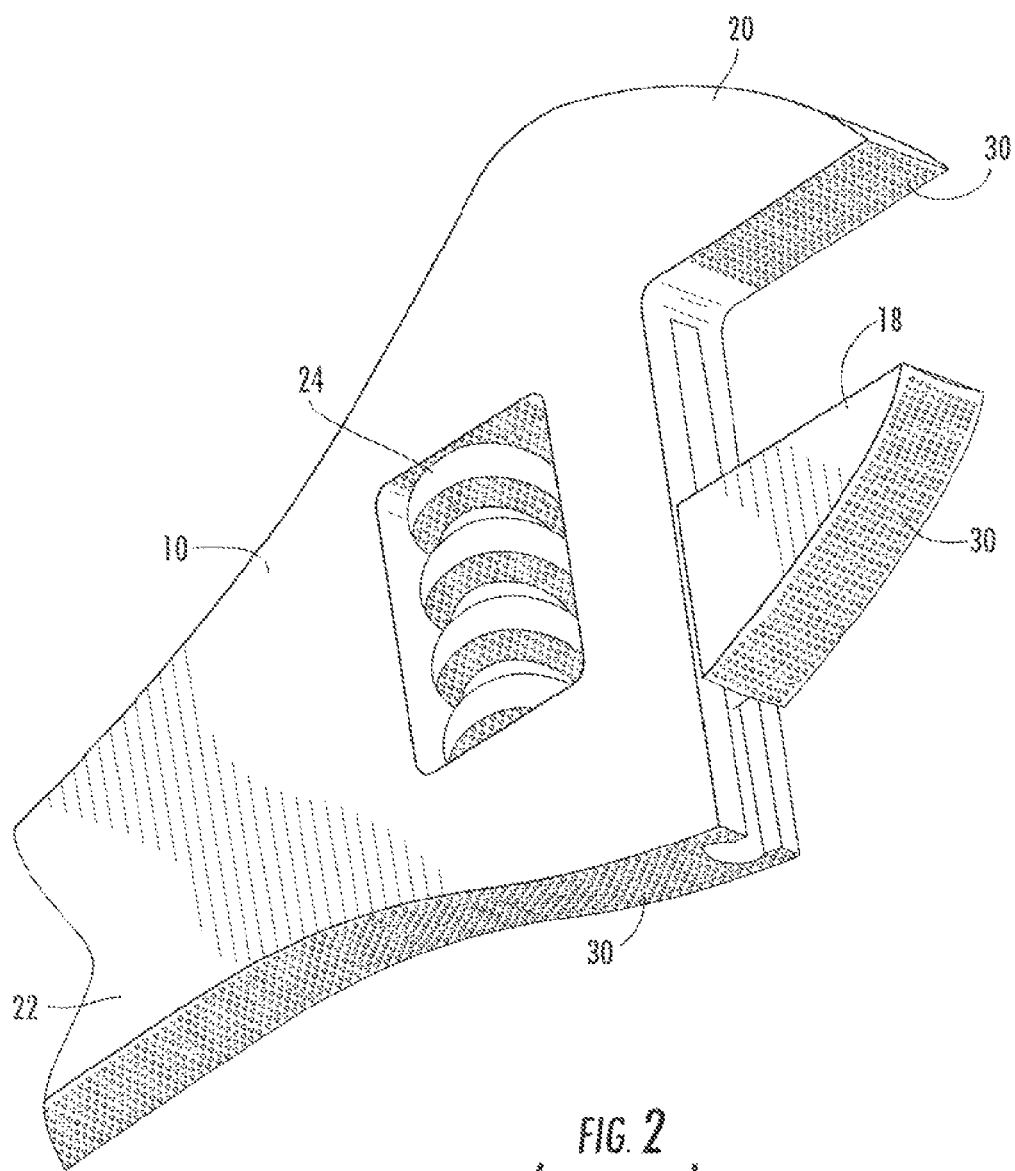
Figure 3:
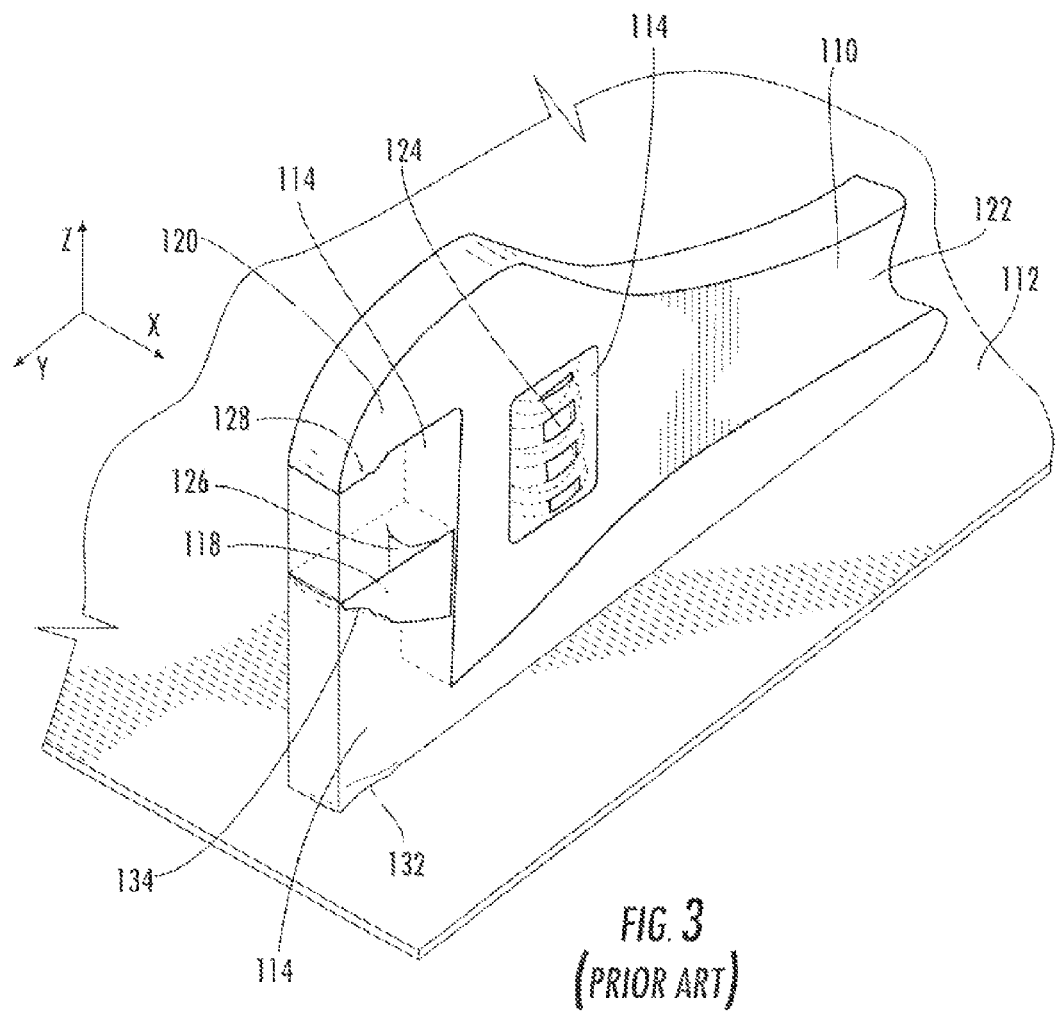
Figure 6:
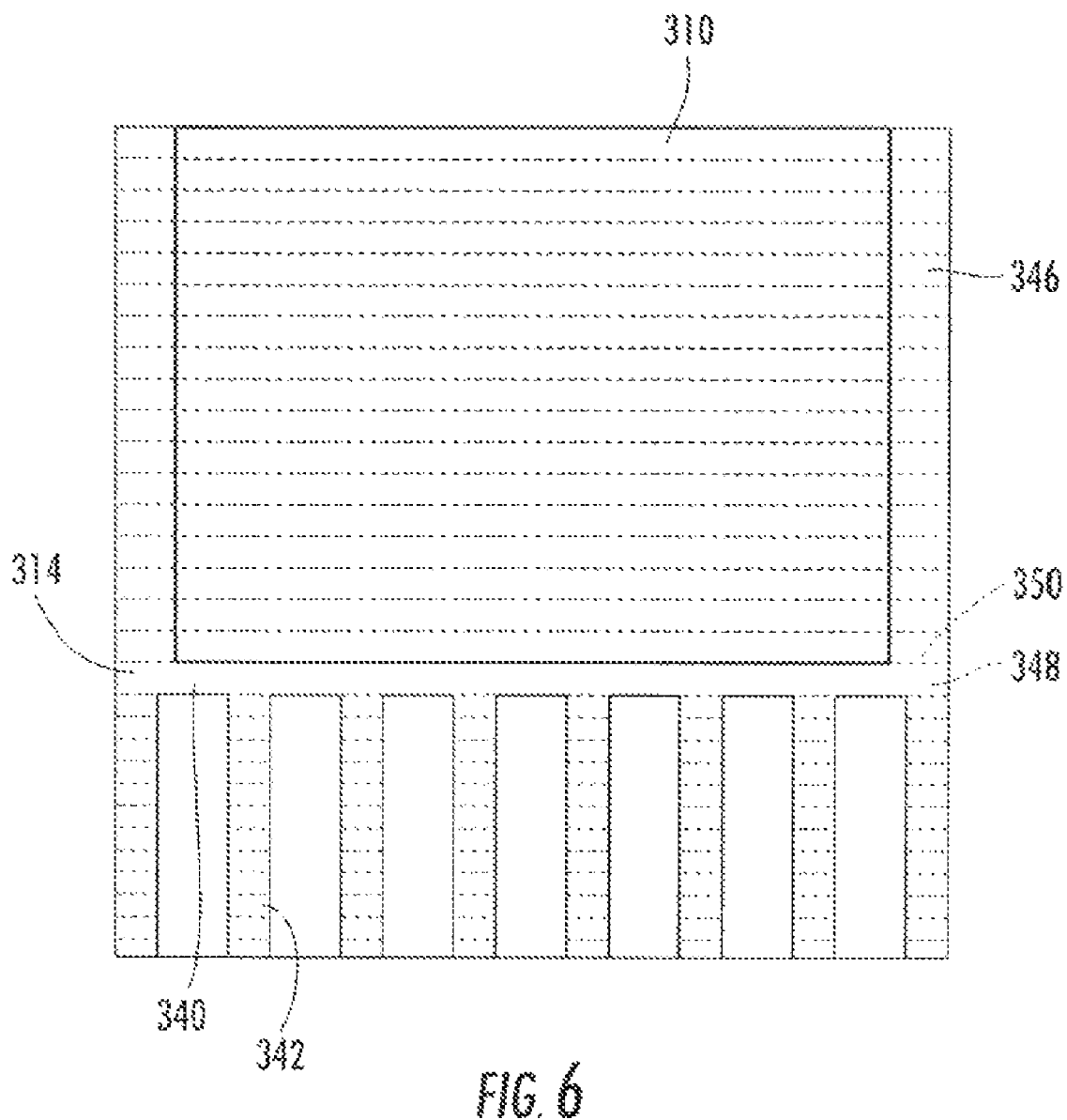
Figure 7:
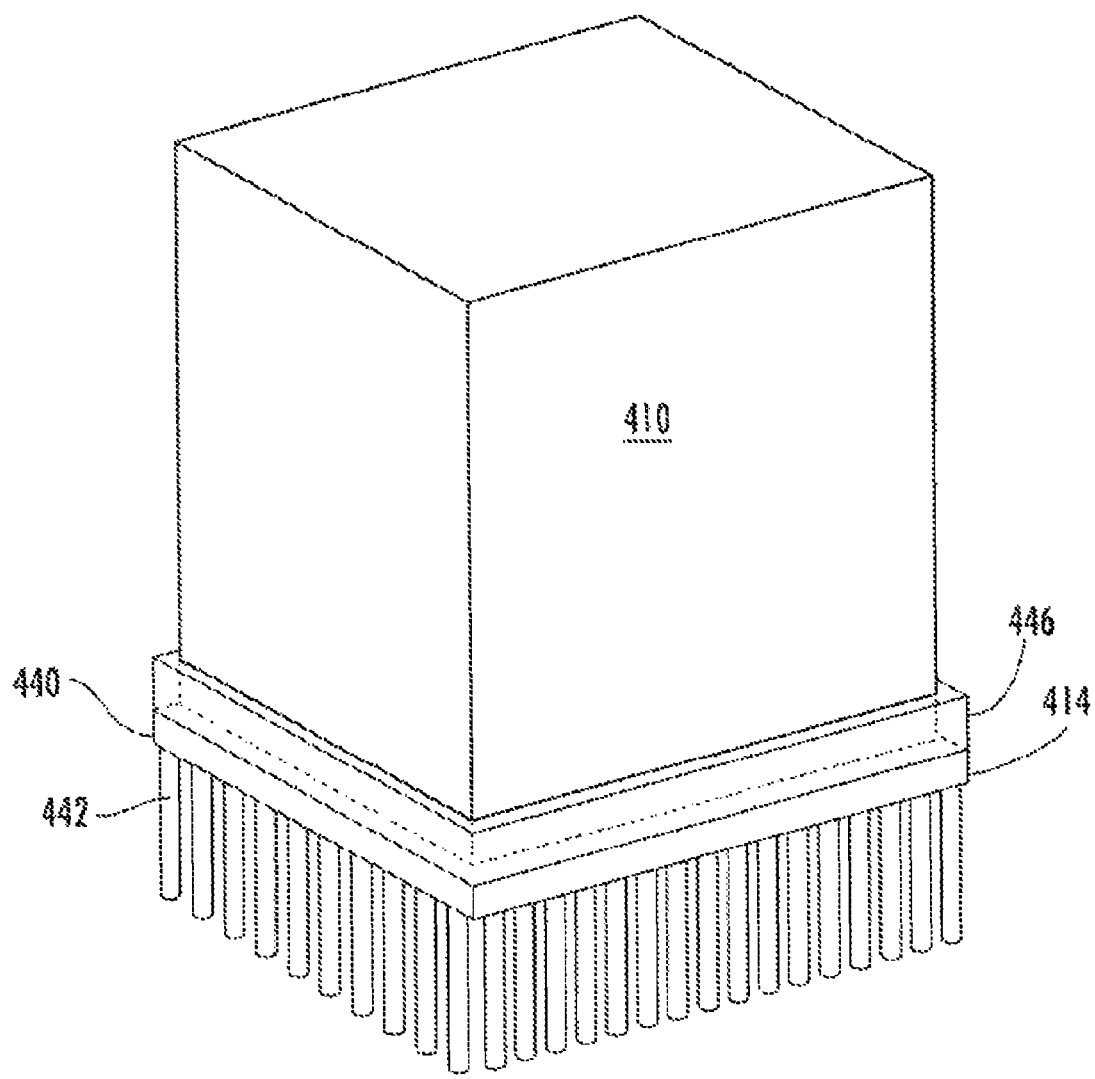
Figure 8:
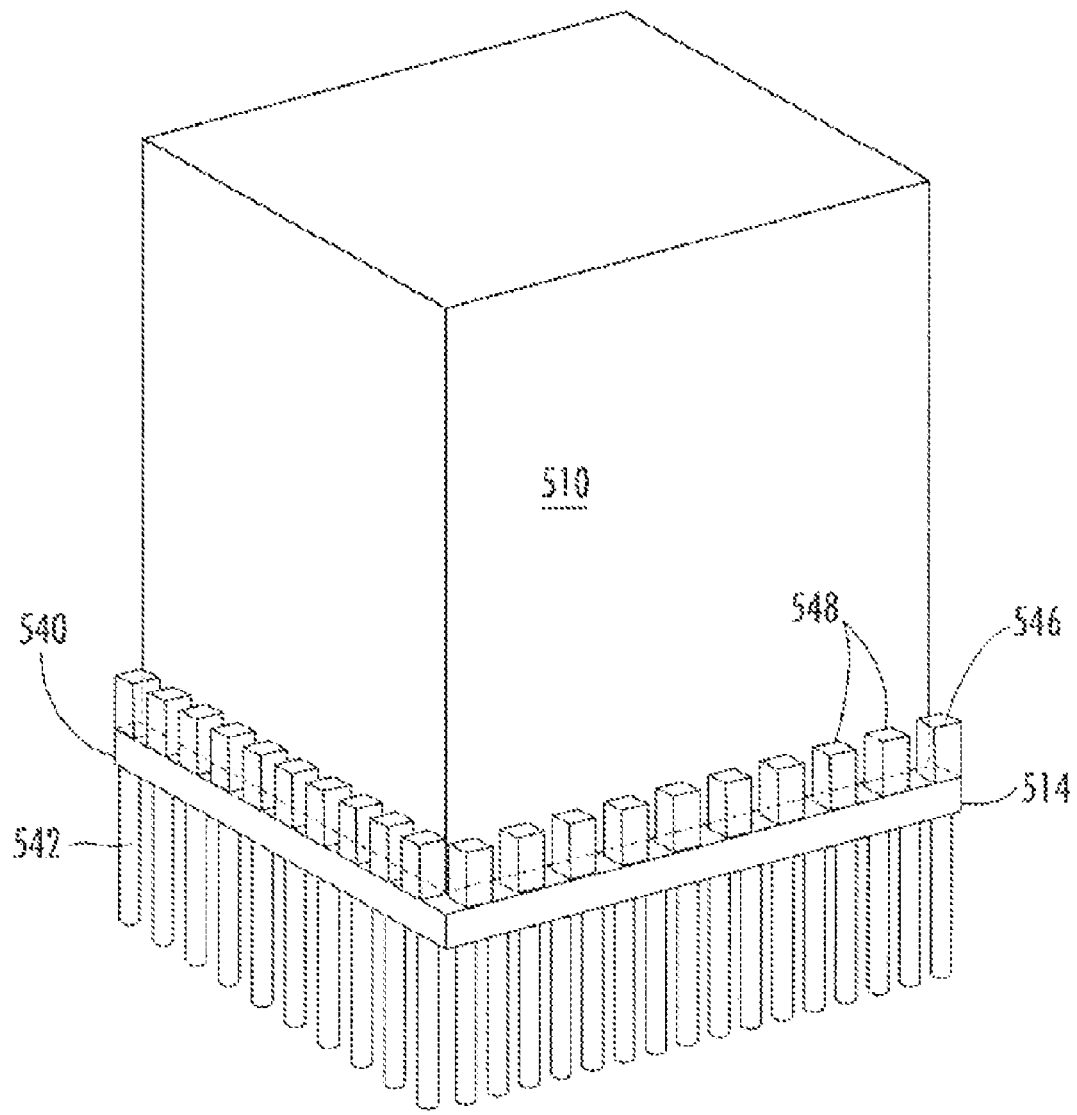
Figure 9:
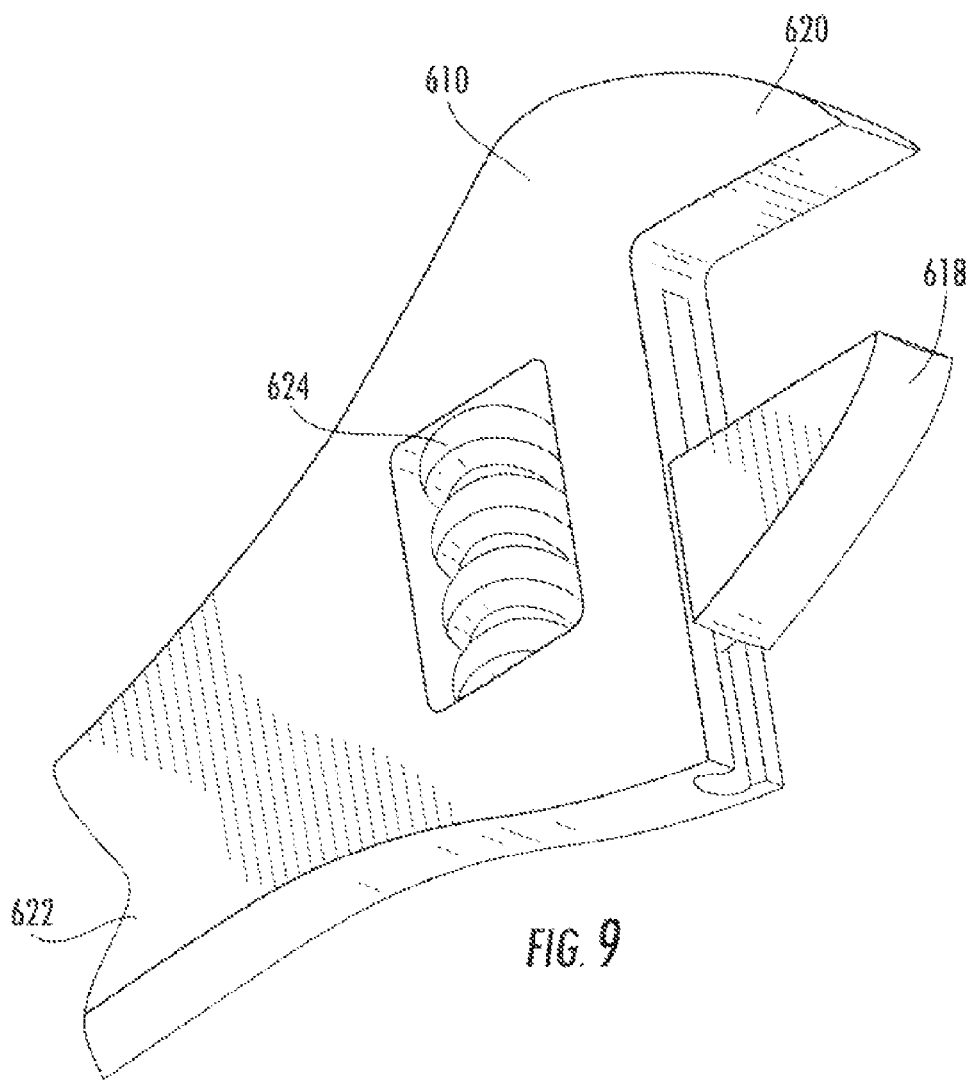

Having thus described the invention in general terms, reference will now be made to the accompanying drawings, which are not necessarily drawn to scale and are meant to be illustrative and not limiting, and wherein:

FIG. 1 is a perspective view of a prior art selective deposition modeling apparatus platform on which the three-dimensional object, namely an adjustable wrench, is made with a build material that is supported with support material comprising a porous support structure;

FIG. 2 is an enlarged perspective view of the prior art adjustable wrench of FIG. 1 in which the support material has been removed by conventional post-processing techniques and that illustrates the defects created on the down-facing surfaces of the adjustable wrench created by the selective depositing of build material onto a porous support structure;

FIG. 3 is a perspective view of a prior art selective deposition modeling apparatus platform similar to FIG. 1 but with the adjustable wrench supported with a solid support structure (as opposed to the porous support structure of FIG. 1) that led to an undesired separation of the support material from the platform that results in a defect in the lower portion of the lower jaw of the wrench and that led to a separation of the support material from the build material on the upper surface of the lower jaw of the wrench that resulted in a defect in the upper jaw of the wrench;

FIG. 4 is a partial side cross-sectional view of another embodiment of the present invention with a three-dimensional object supported with a support structure of one embodiment of the present invention, wherein the support material encapsulates the interface boundary along the perimeter of the support-object interface and wherein a solid support structure is positioned between the porous support structure and the build material;

FIG. 5 is a partial side cross-sectional view of FIG. 4 showing the individual layers of support material and build material that are selectively deposited by the selective deposition modeling apparatus to form the support structure and three-dimensional object, respectively;

FIG. 6 is a side cross-sectional view of yet another embodiment wherein the support structure encapsulates the interface boundary by the depositing of support material that contacts substantially all of a vertical side defined by the build material above the support-object interface;

FIG. 7 is a perspective view of a three-dimensional object and support structure in accordance with a further embodiment of the present invention, wherein all of the interface boundary is encapsulated;

FIG. 8 is a perspective view of a three-dimensional object and support structure in accordance with yet another embodiment of the present invention, similar to FIG. 7 but wherein a substantial portion of the interface boundary is encapsulated; and FIG. 9 is a perspective view of an adjustable wrench similar to the prior art wrenches of FIGS. 2 and 3 but that was made with the apparatus and methods of one embodiment of the present invention, in which the down-facing surfaces do not include the defects because the build material was selectively deposited onto a solid support structure, similar to the support structures in FIG. 7 or 8, and in which the object does not include any defects, such as the defects shown in FIG. 3.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for eliminating and/or reducing the likelihood and extent of undesired surface features on three-dimensional objects are described and shown in the accompanying drawings with regard to specific types of selective deposition modeling techniques, it is envisioned that the functionality of the various apparatus and methods may be applied to any now known or hereafter devised methods and apparatus for the formation of three-dimensional objects in which it is desired to selectively deposit materials in a manner that eliminates or reduces the likelihood that the materials will create undesirable surface features on the resulting three-dimensional objects. Like numbers refer to like elements throughout. The term "selectively deposit" and variations thereof include techniques for depositing build material and/or support material that include, but are not limited to, techniques that include ink jetting (from print heads, nozzles, and the like), fused deposition modeling, moving dispenser(s) with a plotter-type device, and the like.

FIGS. 4-9 disclose various embodiments of the present invention in a non-limiting manner, as further embodiments of the present invention described herein include additional apparatus and methods for improving the surface features of three-dimensional objects formed by depositing materials. FIGS. 1-3 disclose prior art apparatus and methods which led to undesired surface features on the three-dimensional object being formed. Turning first to FIG. 1, the three-dimensional object 10 comprises an adjustable wrench in an upright position. In other words, the top of the wrench extends upwards along the z-axis. The build platform 12 upon which the three-dimensional object 10 is formed defines a plane along the x-axis and the y-axis as generally known in the art. The three-dimensional object 10 is made with a build material that is supported by a support structure 14, as generally known in the art. The build material and support material may be any type of material that may be selectively deposited. Some embodiments of the present invention selectively deposit materials of the type disclosed in U.S. Pat. Nos. 6,841,589; 7,176,253; 7,378,460; and 7,399,796 and U.S. patent application Ser. No. 12/777,418 filed May 11, 2010, all of which are assigned to the present assignee and the disclosures of which are incorporated by reference herein in their entirety.

In the prior art embodiment of FIG. 1, the first layer of support material is first selectively deposited directly on to the build platform 12 to define the support structure 14. Additional layers of support material are then deposited on the previous layer of support material to further define the support structure 14. At a predetermined layer, build material is selectively deposited on to the support material to define the three-dimensional object 10. The support structure 14 of FIG. 1 comprises a porous support structure that includes some openings within the support material defining the support structure. Porous support structures are used in prior art apparatus and methods to reduce the amount of support material used during a build process and to reduce the likelihood of the support material separating from the build platform, as shown in FIG. 3 and discussed in more detail below. The porous support structure of FIG. 1 extends from the build platform 12 to the three-dimensional object 10. The porous support structure of FIG. 1 is illustrated as being a plurality of vertical columns with gaps between the columns; however, the porous support structures of the prior art and of the various embodiments of the present invention include support structures with any openings or gaps in the support structure. Non-limiting examples of alternative porous support structures include (1) columns with scaffolding-like connectors between columns to increase the strength of the porous support structure, (2) curtain style support structures, (3) support structures of various geometries, (4) layers with random or shifting, with respect to adjacent layers, gaps or openings, and (5) any other support structures that provide substantial gaps or openings within the support material comprising the support structure. By comparison, solid support structures known in the prior art and included in various embodiments of the present invention are generally free of gaps or openings purposefully provided in a layer of the support structure and/or adjacent layers of the support structure such that the support structure generally defines a solid structure.

The support structure 14 of FIG. 1 is porous to provide gaps within the support structure so that as the selectively deposited support material cools from a generally liquid state to a generally solid state, the stresses created in the support structure due to any shrinking or other chemical or mechanical properties are generally isolated so that an aggregate amount of stress is not generated which could cause the cooled support material to separate from the build platform. Such separation of a solid support structure 114 from the build platform 112 is represented in FIG. 3 by the separation 132 at one corner of the support structure that results in defect 134 in the low jaw 118 of the wrench. Similarly, FIG. 3 illustrates separation 126 of the solid support structure 114 from the upper surface of the lower jaw 118 resulting in defect 128 in the upper jaw 120. Separation of the support material from either the build platform or previously deposited build material may lead to undesired surface features or other defects in the build material deposited above the separation, as described more fully with respect to FIG. 3 below. Alternatively, build material selectively deposited on support material may separate leading to undesired surface features or other defects with the build material.

As noted above, a separation of support material may occur at an interface between the support material and the build material. For example, FIG. 3 shows separation of the support structure 114 from an up-facing surface of the three-dimensional object 110. The adjustable wrench formed as the three-dimensional object 110 of FIG. 3 includes a lower jaw 118 and an upper jaw 120. As generally known, the upper jaw is in a fixed location, relative to the handle 122, and the lower jaw 118 is movable, relative to the handle and upper jaw, by rotating shaft 124 (such movement is possible for the three-dimensional object 110 after the build process is complete, and the support material has been removed through conventional post-processing techniques). During the build process, after the lower jaw 118 is complete the support material is selectively deposited on the up-facing surface of the lower jaw to continue the support structure to provide support for the build material to be later selectively deposited to define the upper jaw 120. FIG. 3 illustrates how during the forming of the portion of the support structure 114 between the lower jaw 118 and upper jaw 120, the support material separated from the build material along the up-facing surface of the lower jaw. This separation 126 directly resulted in the defect 128 along the down-facing surface of the upper jaw. More specifically, the down-facing surface of the upper jaw 120 was intended to be a flat surface generally defined along the x- and y-axes; however, when separation 126 occurred, the support material proximate the separation also shifted thus causing an undesirable shift in the support structure proximate the down-facing surface of the upper jaw. Therefore, when the build material is selectively deposited on the support structure 114, the build material conforms to the shifted shape of the support structure, thus creating an undesired feature of the three-dimensional object 110. Because such undesired features are considered defects, thus leading an operator or end user to consider the build a failure, various embodiments of the present invention provide apparatus and methods for preventing undesired separation of the support material from the build material, or vice versa, and/or separation of the support material from the build platform.

One conventional technique for preventing the separation of the support material from the build material at the support-object interface is to provide a support-object interface that does not provide a smooth plane. The support-object interface is the area of contact, in the direction of the z-axis, between the build material and the support material. The prior art typically provides a support structure that has the same footprint as the three-dimensional object, such that viewing along the z-axis, the shape of the object in the x- and y-axes is generally the shape of the support structure. However, unless the down-facing surface of the three-dimensional object is a flat plane defined in the same layer of selective deposition, there will be some contact of build material and support material in the direction of the x-axis and/or y-axis based upon the object having down-facing surfaces at different layers, thus providing vertical sides that contact the support material in the x-axis and/or y-axis directions. This contact of build material and support material in the direction of the x-axis and/or y-axis is generally not included in the support-object interface of concern in the present invention. The prior art technique of providing a non-smooth plane at the support-object interface creates additional area of contact between the build material and support material because small amounts of build material migrate into the openings of the porous support structure (or vice versa), thus increasing the ability of the materials to resist separation from one another as the materials cool and stresses are created.

By creating or permitting such migration of build material into the porous support structure (or vice versa), undesired surface features are created because the resulting down-facing surfaces of the three-dimensional object will not be smooth (or the resulting up-facing surfaces in the case of depositing support material on a non-smooth up-facing surface of build material). For example, FIG. 2 illustrates the adjustable wrench of FIG. 1 after the support structure 14 has been removed by conventional post-processing techniques, such as placing the platform with the support structure and object into an oven device that raises the temperature to above the melting point of the support material but below the melting point of the build material such that the support material melts away leaving the three-dimensional object. FIG. 2 shows a plurality of protrusions 30 on the down-facing surfaces of the finished three-dimensional object 10 created by migration of build material into the porous support structure during the build process. These protrusions are undesirable surface features that are typically removed by manually sanding the down-facing surfaces and/or applying a solvent to the down-facing surfaces to remove the protrusions. Such additional process steps take additional time and can possibly lead to having too much material removed, thus leading to other undesirable surface features. Some embodiments of the present invention resolve this problem by preventing the migration of build material below the intended down-facing surface.

Turning now to the prior art representation of FIG. 3, the three-dimensional object 110 comprises an adjustable wrench similar to the wrench of FIGS. 1 and 2. The three-dimensional object 100 is supported by a solid support structure 114 that is generally without gaps or openings within the support structure. Such support structures can minimize or eliminate protrusions of the type shown in FIG. 2 and discussed above; however, such support structures can experience the undesired separation at the support-object interface and/or at the interface of the support structure and the build platform discussed above. The solid support structure 114 of FIG. 3 has experienced a separation 126 at the interface of the support structure and the up-facing surface of the lower jaw 118, thus resulting in a defect 128 in the down-facing surface of the upper jaw 120. The solid support structure 114 of FIG. 3 also experienced a separation 132 at one corner where the support structure contacts the build platform 112. The separation 132 distorts the shape of the support structure 114 above and/or adjacent the separation, which can lead to defects in the three-dimensional object 110, such as the defect 134 in the down-facing surface of the lower jaw 118. Solid support structures 114 are more likely to experience separation at the interface with the build platform 112, as compared to porous support structures, because of the greater stresses and/or shrinkage experienced by the larger contiguous areas of the layers of the solid support structure. Such stresses and/or shrinkage experienced by the layers of the solid support structure can become great enough to overcome the adhesion between the support structure and the surface of the build platform and result in a sudden or gradual separation of the support structure from the build platform. This mode of separation can also be experienced by porous support structures. Moreover, this mode of separation can also occur at the support-object interface as well for either solid support structures or porous support structures.

Because the support structure 114 and three-dimensional object 110 are built in a layer-by-layer process, the timing and extent of the separation 126 or 128 has a direct impact on the presence and/or significance of the resulting defect, 128 and 134, respectively. For example, if the separation occurs long before the first layer of build material is selectively deposited above and/or adjacent the separation, the amount of support material that is removed with a planarizer or other devices, as known in the art, from the intervening layers of support material may compensate to some extent for the deformation created by the separation. Conversely, if the separation occurs shortly before the first layer of build material is selectively deposited above and/or adjacent the separation, the apparatus and method will have fewer layers of intervening support material that can compensate for the separation, thus making it more likely that the resulting defect will be present and/or more significant. Therefore, the size, shape, timing, and other variables relating to the separation have a direct impact on the presence and/or significance of the defect in the formed three-dimensional object. Accordingly, various embodiments of the present invention eliminate and/or reduce the likelihood of separation occurring in the first place, thus ensuring that a defect will not result.

Turning now to one embodiment of the present invention, FIGS. 4 and 5 represent one method for eliminating or reducing the likelihood of separation at the support-object interface. The illustrated embodiments of the present invention are shown with the build material selectively deposited on the support material; however, further embodiments of the present invention use the same and similar techniques when the support material is selectively deposited on the build material to similarly eliminate or reduce the likelihood of separation at the support-object interface. FIGS. 4 and 5 show the three-dimensional object 210, formed with build material supported by a support structure 214 formed with support material. The support structure is positioned on a build platform (not shown in FIGS. 4-8). FIG. 5 represents with dashed lines the individual layers of build material and support material that are selectively deposited.

The three-dimensional object 210 of the embodiment of FIGS. 4 and 5 is made in a conventional fashion by selectively depositing build material. The inventive aspects of the FIGS. 4 and 5 embodiment of the present invention are (1) the combination of a solid support structure 240 and a porous support structure 242 and (2) the encapsulating of the interface boundary along a perimeter of the support-object interface. The embodiment of FIGS. 4 and 5 also includes a transition support structure 244 between the solid support structure 240 and the porous support structure 242. The encapsulation 246 of FIGS. 4 and 5 comprises a widening of the support structure beyond the edges of the three-dimensional object 210 (typically the support structure is provided only beneath the three-dimensional object) and extending the support structure at least one layer 250 above the support-object interface (in the FIGS. 4 and 5 embodiment, an additional eight layers of support material is selectively deposited to form the encapsulation 246) such that the support material of the encapsulation contacts a vertical side defined by the build material above the object-support interface (a vertical side of the build material is any surface of the build material or resulting three-dimensional object that has a vertical component in the direction of the z-axis). The encapsulation 246 of FIGS. 4 and 5 is similar to the encapsulation 346 of FIG. 6 and encapsulation 446 of FIG. 7 because the encapsulation encapsulates all of the interface boundary to provide a vacuum for the object-support interface. Further embodiments of the present invention encapsulate less than all of the interface boundary but at least a substantial portion of the interface boundary sufficient to prevent separation of the build material from the support material during the build process. By encapsulating a substantial portion of the interface boundary, localized vacuums are provided by the individual portions of the encapsulation, and such localized vacuums provide sufficient resistance to the stresses or forces that would otherwise cause the object and/or support to separate from one another. Certain embodiments of the present invention that encapsulate a substantial portion of the interface boundary also provide resistance to separation at the support-object interface by providing structural strength proximate the support-object interface sufficient to prevent the separation, whether or not localized vacuums are provided.

The term "encapsulating," "encapsulation," and variations thereof as used herein to describe the embodiments of the present invention and to recite the claimed invention comprise the selective deposition of support material, or the deposited support material itself, proximate the interface boundary of the support-object interface that eliminate or reduce the likelihood of separation of the build material and support material from one another. These terms include the selective deposition of support material beyond (in the plane of the x- and y-axes) the cross-section area (as viewed along the z-axis) of the down-facing surfaces of the three-dimensional objects and include the selective deposition of support material above (in the direction of the z-axis) the perimeters of the down-facing surfaces. Although providing a vacuum at the interface boundary is one desirable aspect of certain embodiments of the present invention, the terms "encapsulating," "encapsulation," and variations thereof do not necessarily require that a vacuum be present or provided at the interface boundary. The terms include the deposition of support material in any fashion that provides resistance, for example by increased structural strength at the support-object interface or by providing a vacuum at or near the support-object interface, to the tendency of the build material and support material to separate from one another during the build process.

The vacuum provided by the encapsulations 246, 346, and 446 of the embodiments of FIGS. 4-7 of the present invention is desirable because it prevents air (or other gases or mediums present inside the build chamber of the apparatus for forming three-dimensional objects) from being available to enter between the build material and support material if separation were to occur. Because no air is available to enter the void created by a separation, the forces required for the separation to occur are significantly increased, thus decreasing the likelihood that separation will occur. As previously discussed, separation is undesirable because of the resulting defects created in the resulting three-dimensional object; therefore, this vacuum provided by the encapsulation ensures, or at least increases the likelihood, that the build material as dispensed will accurately represent the desired three-dimensional object.

Alternative embodiments of the present invention, that do not provide a vacuum along the entire interface boundary or that provide only partial vacuums at predetermined locations along the interface boundary, also or alternatively provide structural resistance to separation at the support-object interface. More specifically, certain embodiments of the present invention selectively deposit support material that contacts the vertical sides of the three-dimensional object defined by the build material above the support-object interface. This contact of support material on the sides of the build material provides a force that resists movement of the build material relative to the support material. A non-limiting example of relative movement is the curling of build material away from the support-object interface. The encapsulation provides a force that counteracts the tendency of the build material to curl or otherwise move, thus preventing the curl or movement. Once additional layers have been deposited and/or once the build process is complete and post-processing is undertaken, the tendency of build material and/or support material to have relative movement will have abated such that removal of the support material (including the encapsulation) will not lead to movement of the build material alone (which would result in a defect in the three-dimensional object). The amount of force desired to prevent the relative movement of build material and support material can be predetermined (by the build software or manually) so that the portions of the encapsulation can be sized and shaped accordingly. In other words, the height, width, thickness, and geometry of the encapsulation can be predetermined to provide the appropriate structural strength to prevent or reduce the likelihood of separation at the support-object interface.

Turning once again to the embodiment of the present invention represented in FIGS. 4 and 5, although even a single layer of support material, such as layer 250, would be sufficient to provide a vacuum for the support-object interface, the encapsulation 246 comprises eight layers of support material to make it even less likely that air (or other gas or medium) could pass between the vertical side defined by the build material and the encapsulation. FIG. 6 illustrates a further embodiment of the present invention wherein the encapsulation 346 contacts substantially all of a vertical side defined by the build material above the support-object interface. Although the three-dimensional objects of FIGS. 4-6 are illustrated as cubes for simplicity, it should be appreciated that the techniques for encapsulating and for the resulting encapsulations may be applied to any geometry of three-dimensional objects, including but not limited to angled, curved, or polygonal sides that include a vertical component in the z-axis direction (and are thus considered vertical sides).

The thickness of the encapsulations 246 and 346 of FIGS. 4-6, as measured along the x-axis and y-axis, may comprise any thickness necessary to provide the desired vacuum or structural strength required or desired to prevent or reduce the likelihood of separation at the support-object interface. The amount of support material required to build the encapsulation is taken into account in certain embodiments of the present invention because the height and thickness (and the width in further embodiments) of the encapsulation directly relate to the amount of support material to be consumed. Thus, certain embodiments of the present invention include minimizing the amount of support material consumed while providing adequate encapsulation to prevent or reduce the likelihood of separation.

The encapsulation techniques of certain embodiments of the present invention also include providing support material at the support-object interface when support material is deposited on previously deposited build material. For example, in order to make the adjustable wrench 122 of FIG. 3 without the defect 128 resulting from the separation 126, certain embodiments of the present invention selectively dispense additional support material in the direction of the x-axis and along the length (in the direction of the y-axis) of the up-facing surface of the lower jaw 118 so that the sides of the lower jar are surrounded by support material. The support material in further embodiments is selectively dispensed in the direction of the y-axis and along the width (in the direction of the x-axis) of the front of the up-facing surface of the lower jaw 118 so that the front of the lower jar is surrounded by support material. Thus the entire up-facing surface of the lower jaw 118 is encapsulated with support material. The encapsulation of some embodiments is a solid support structure that provides a vacuum for the support-object interface along the entire interface boundary of the up-facing surface of the lower jaw 118. Therefore, separation of the support material 114 is much less likely to occur; thus preventing or reducing the likelihood that a separation, similar to separation 126, would occur and preventing or reducing the likelihood that a defect, such as defect 128, would occur. Therefore, it should be appreciated that the encapsulating techniques of the present invention can be used for any support-object interface, whether build material is being selectively deposited on support material or support material is being selectively deposited on build material.

Turning now to FIG. 8, the encapsulation 546 comprises a plurality of portions 548 that encapsulate a substantial portion of the interface boundary sufficient to prevent separation of the build material from the support material during the build process. The number, shape, and size of the portions 548 depends upon many variables, some of which may include, but are not limited to, the chemical and/or mechanical properties of the build material and support material, the shape of the interface boundary, and the amount of force and/or localized vacuum required or desired to prohibit relative movement of the deposited build material and support material. Although the embodiment of FIG. 8 does not encapsulate all of the interface boundary, like in the embodiment of FIG. 7, the embodiment of FIG. 8 provides sufficient localized vacuum and/or structural strength to prevent or minimize the likelihood of separation at the support-object interface and requires the use of less support material, as compared to the embodiment of FIG. 7.

Turning again to the embodiment illustrated in FIGS. 4 and 5, the support structure 214 comprises a porous support structure 242, a transition support structure 244, and a solid support structure 240. The porous support structure 242 is first selectively deposited on the build platform (not shown in FIGS. 4 and 5) and extends upward in the z-direction to a predetermined height relative to the anticipated height of the down-facing surface of the three-dimensional object (the first layer of build material to be deposited above that respective portion of the support structure). The predetermined height of the porous support structure 214 is based upon a determination of the first layer of build material to be selectively deposited for a particular region of the object. In certain embodiments of the present invention, the object is considered (by the controller and other computer hardware and software operating the apparatus for forming three-dimensional objects and/or the controller and other computer hardware and software used to generate electronically the support structure for the particular three-dimensional object(s) to be formed) as having a plurality of regions for alt the down-facing surfaces of the object (the first layer of build material selectively deposited for a particular x,y position or positions). The size of the regions may vary from as small as the size of the smallest particle of build or support material that can be selectively deposited or can be as large as the entire cross-sectional area (viewed along the z-axis) of the object, whether or not the object has a down-facing surface in the same plane (for example, as illustrated in FIGS. 4 and 5). Once the first layer of build material is determined for the plurality of regions, for example the layer represented by layer 250 in FIG. 5, the layers of the solid support structure 240 can then be determined. For the embodiment of FIGS. 4 and 5, the solid support structure 240 comprises five layers. Layer 248 in FIG. 5 is the final layer of solid support structure 240 selectively deposited. Therefore, the controller (or other computer hardware or software used with the present invention) can determine that the first layer of support material to be deposited to provide a solid support structure is four layers prior to layer 248. Further embodiments of the present invention comprise anywhere from one layer of solid support structure to the highest number of layers of solid support structure practical.

Because the embodiment of FIGS. 4 and 5 provide a transition support structure 244 between the solid support structure 240 and porous support structure 242, and the transition support structure comprises two layers, the controller (or other computer hardware or software used with the present invention) can determine that the first layer of support material to be deposited to provide a transition support structure is six layers prior to layer 248. Further embodiments of the present invention comprise anywhere from zero layers of transition support structure (as shown in FIG. 6) to the highest number of layers of transition support structure practical. The transition support structure is desired in some embodiments of the present invention to provide a gradual transition from the porous support structure to the solid support structure to eliminate or reduce the likelihood of structural problems occurring resulting from stress concentrations or the like. The transition support structure 244 of FIGS. 4 and 5 generally comprise arch-type shapes, but any shape, size, height, etc. of transition support structures may be used with the present invention, including but not limited to step shapes, frustoconical shapes, scaffolding type connections between columns, and the like. The types of transition support structure used in some embodiments of the present invention depend up the size, number, shape, and other parameters of gaps or openings provided in the porous support structure. For example, in an embodiment of the present invention in which the porous support structure comprises randomize or predetermined openings, the transition support structure includes increasingly fewer and/or smaller openings as the transition support structure rises from the porous support structure to the solid support structure.

The embodiment of the present invention illustrated in FIGS. 4 and 5 includes a porous support structure 242 that includes gaps or openings similar to prior art support structures discussed above. The porous support structure 242 of FIGS. 4 and 5 extends from the build platform (not shown) to the transition support structure 244. The porous support structure 242 is sized and shaped to prevent or reduce the likelihood of separation of the support structure from the build platform. By providing both a porous support structure 242 in contact with the build platform and a solid support structure 240 in contact with the down-facing surface of the three-dimensional object 210 (for example, represented by the build material selectively deposited in layer 250 of FIG. 5), embodiments of the present invention prevent or reduce the likelihood of defects (for example, defect 134 in FIG. 3) being formed in the three-dimensional object because of separation at the support-build platform interface (for example, separation 132 in FIG. 3) while at the same time preventing or reducing the likelihood of surface defects (for example, the plurality of protrusions 30 in FIG. 2) on the down-facing surfaces of the three-dimensional object that can form when a solid support structure is not provided below the first layer of selectively deposited build material. As previously discussed with respect to FIG. 3, prior art support structures that comprised only a solid support structure often experienced separation at the support-build platform interface and the support-object interface, both of which could lead to defects in the three-dimensional object formed. The likelihood and extent of the separation and the resulting defect depended in part upon the specific build material and support material used in the build process. However, various embodiments of the present invention that include both the support structure 240, 340, 440, 540 and the like and the encapsulation 246, 346, 446, 546 and the like overcome these separation problems experienced by almost any support material and/or build material.

The present invention also, provides many methods for forming a three-dimensional object in successive layers in accordance with data defining the object. The data defining the object is typically computer aided design (CAD) data representative of the three-dimensional object, as understood by one skilled in the art. The CAD data of certain embodiments of the present invention is contained in an STL file (or other file format) that is communicated to the apparatus for forming three-dimensional objects or to a computer in communication with the apparatus for forming three-dimensional objects. The object is made from a build material and the object is supported by a support material during a build process. The layers are successively deposited along a z-axis. The method comprises, in any order possible, (1) determining for a plurality of regions of the object a first layer of build material to be selectively deposited, (2) selectively depositing the support material on a platform to provide a porous support structure; (3) determining for the plurality of regions of the object a first layer of support material to be deposited to provide a transition support structure and/or a solid support structure; (4) selectively depositing the support material on the porous support structure to provide the transition support structure and/or a solid support structure; and (5) selectively depositing the build material on the solid support structure to provide a substantially smooth down-facing surface for the build material. The determining operations may be completed prior to selectively depositing any materials and/or the determining operations may be performed during the selective depositing of earlier layers of the build process. The determining operations may include provide a predetermined number of layers for the porous support material, the transition support material, and/or the solid support material, relative to one another and/or relative to the first layer of build material to be selectively deposited above the respective support structure(s).

Further methods of the present invention for forming a three-dimensional object in successive layers include the operations of (1) selectively depositing the support material on a platform to provide a support structure; (2) selectively depositing the build material on the support structure to define the object wherein the area of contact, in the direction of the z-axis, between the build material and the support material defines a support-object interface and an interface boundary along a perimeter of the support-object interface; and (3) encapsulating the interface boundary with support material. The encapsulating of various embodiments of the invention encapsulates either all of the interface boundary or a substantial portion of the interface boundary sufficient to prevent separation of the build material from the support material during the build process. The encapsulating operation may provide a vacuum for the support-object interface and/or provide structural support to the support-object interface; both of which prevent or inhibit any separation of the build material from the support material during the build process. The encapsulating operation of various embodiments of the present invention comprise depositing only a single layer of support material that contacts a vertical side defined by the build material, any number of layers of support material that contact a vertical side defined by the build material, and the same number of layers of support material as build material such that the support material contacts substantially all of a vertical side defined by the build material. The methods of certain embodiments of the present invention comprise removing the support material from the build material after the selective depositing is complete (after the build process). The techniques for removing the support material include, but are not limited to, heating the build material and support material to cause the support material to separate from the build material, applying solvent to the support material to cause the support material to separate from the build material, and/or manually removing the support material from the build material.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

That which is claimed:

1. A method of forming a three-dimensional object in successive layers in accordance with data defining the object, wherein the object is made from a build material and the object is supported by a support material during a build process and wherein the layers are successively deposited along a z-axis, the method comprising:

selectively depositing the support material on a platform to provide a support structure, wherein the support structure comprises a porous support structure that is proximate the platform and a solid support structure that is deposited on the porous support structure opposite the porous support structure from the platform;

selectively depositing the build material on the support structure to define the object wherein the area of contact, in the direction of the z-axis, between the build material and the support material defines a support-object interface and an interface boundary along a perimeter of the support-object interface; and encapsulating the interface boundary with support material.

2. A method according to claim 1, wherein encapsulating the interface boundary comprises encapsulating a substantial portion of the interface boundary sufficient to prevent separation of the build material from the support material during the build process.

3. A method according to claim 1, wherein encapsulating the interface boundary provides a vacuum for the support-object interface.

4. A method according to claim 1, wherein encapsulating the interface boundary comprises depositing at least one layer of support material that contacts a vertical side defined by the build material above the support-object interface.

5. A method according to claim 1, wherein selectively depositing the support material comprises dispensing at least one layer of support material substantially free of openings at the support-object interface.

6. A method according to claim 1, wherein selectively depositing the support material comprises providing a transition support structure between the porous support structure and the solid support structure.

7. A method according to claim 1, wherein a first layer of the solid support structure that is selectively deposited is a predetermined number of layers below a lowermost downfacing surface of the build material to be deposited.

8. A method of forming a three-dimensional object in successive layers in accordance with data defining the object, wherein the object is made from a build material and the object is supported by a support material during a build process and wherein the layers are successively deposited along a z-axis, the method comprising:
   selectively depositing the support material on a platform too provide a porous support structure;
   determining for a plurality of regions of the object at layer of build material to be selectively deposited;
   determining for the plurality of regions of the object a first layer of support material to be deposited to provide a solid support structure, wherein the solid support structure is positioned between the porous support structure and the build material;
   selectively depositing the support material on the porous support structure to provide the solid support structure; and
   selectively depositing the build material on the solid support structure to provide a substantially smooth downfacing surface for the build material.

9. A method according to claim 8, wherein selectively depositing the support material on the porous support structure to provide the solid support structure comprises dispensing at least one layer of support material substantially free of openings at the support-object interface.

10. A method according to claim 8 further comprising selectively depositing the support material on the porous support structure to provide a transition support structure between the porous support structure and the solid support structure.

11. A method according to claim 10, wherein selectively depositing the support material to provide the transition support structure comprises dispensing support material that reduces at least one of the size and number of openings in the deposited support material as the transition support structure extends vertically along the z-axis.

12. A method according to claim 8, wherein a first layer of the solid support structure that is selectively deposited is a predetermined number of layers below a lowermost downfacing surface of the build material to be deposited.

* * * * *